No. 631,171. Patented Aug. 15, 1899.
J. W. MAXEY.
CHURN.
(Application filed Mar. 7, 1899.)
(No Model.) 2 Sheets—Sheet 1.
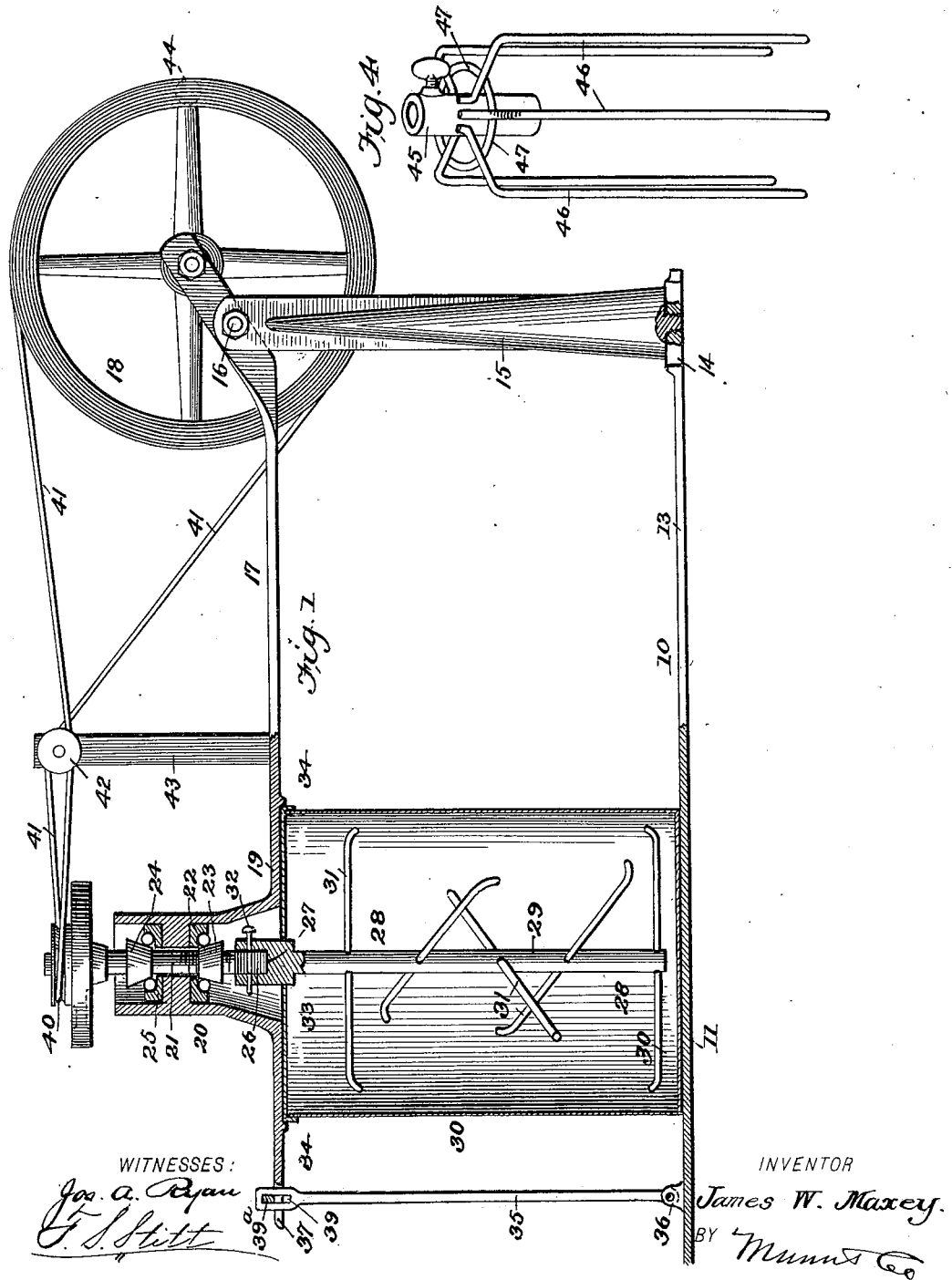
WITNESSES:
Jos. A. Ryan
F. S. Stitt
INVENTOR
James W. Maxey.
BY Munn & Co,
ATTORNEYS.

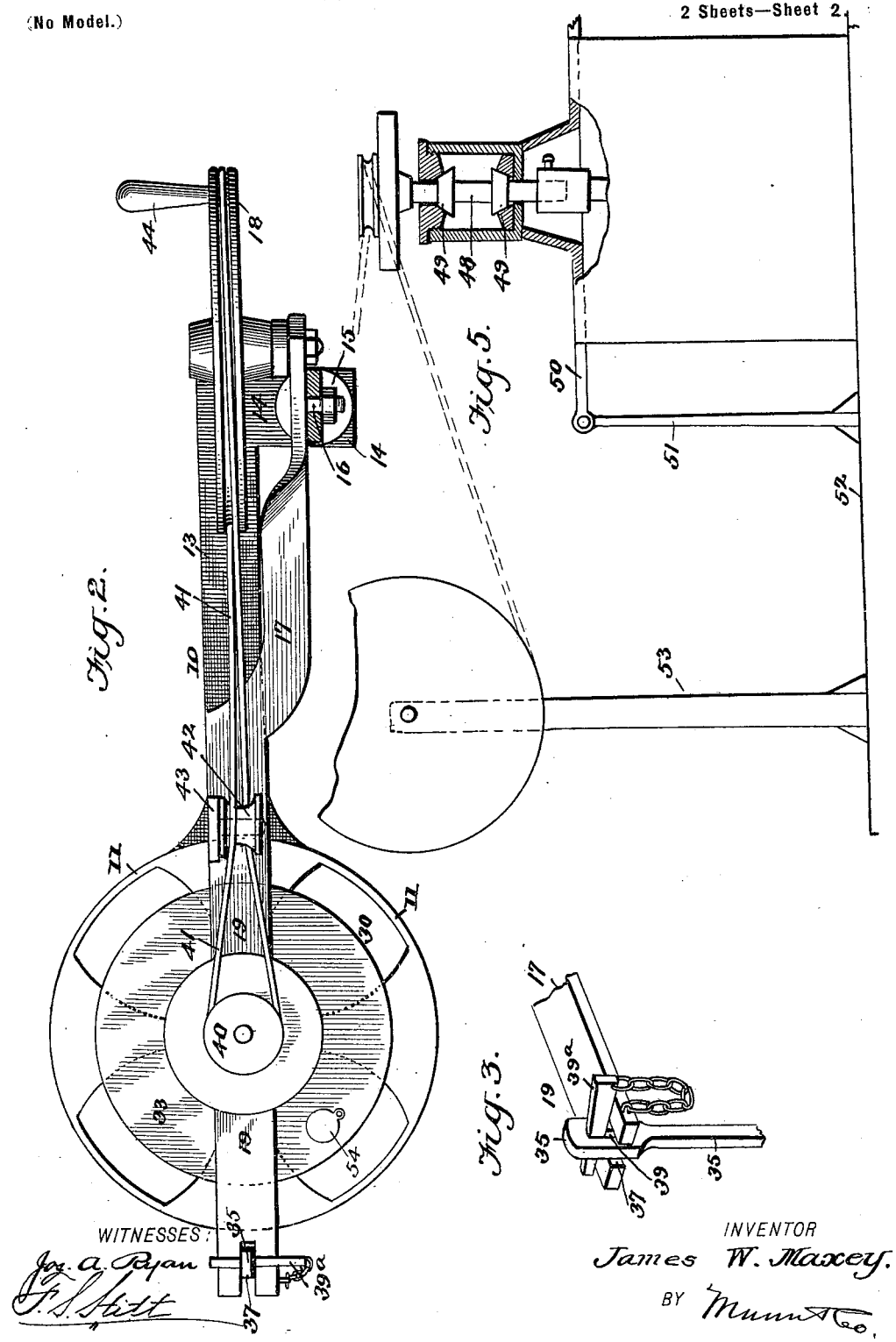

UNITED STATES PATENT OFFICE.

JAMES WESLEY MAXEY, OF PLYMOUTH, INDIANA, ASSIGNOR OF ONE-HALF TO LAWRENCE LINKENHELT, OF SAME PLACE.

CHURN.

SPECIFICATION forming part of Letters Patent No. 631,171, dated August 15, 1899.

Application filed March 7, 1899. Serial No. 708,119. (No model.)

*To all whom it may concern:*

Be it known that I, JAMES WESLEY MAXEY, of Plymouth, in the county of Marshall and State of Indiana, have invented a new and useful Improvement in Churns and Mechanism for Operating the Same, of which the following is a specification.

My invention relates to churns and mechanism for operating the same, and has for its object a churn which will operate in a quick and efficient manner and mechanism for operating a churn constructed in accordance with my invention or other churns of ordinary construction and of different sizes.

The invention consists in certain combinations and arrangement of parts, which I shall first describe and then point out the novel features in the appended claim.

Reference is to be had to the accompanying drawings, forming part of this specification, in which—

Figure 1 is a sectional side elevation of my improved churn and its operating mechanism. Fig. 2 is a plan view of the same. Fig. 3 is a detail view illustrating the means for locking the beam in place. Fig. 4 is a detail view illustrating a form of dasher employed, and Fig. 5 is a modified form of the improvement.

The base 10 for the support of the churn-body and the operating mechanism consists of a circular part 11, formed to receive the bottom rim of churn-cylinders, and a straight arm 13 extends radially from such circular part and terminates in a right-angled foot 14, formed to receive the post 15. The base 10 is preferably made in one piece and may be formed of metal, wood, or other suitable material. On this foot 14 is supported a post 15, whose upper end is apertured and receives a lateral lug 16 on a beam 17, the latter being held thereto by a nut on the end of the lug and having free movement in a vertical plane. The rear end of the beam supports a band-wheel 18, and the beam in front of the post, preferably at about midway of its length, is bent or offset, so as to bring its forward portion 19 directly over the center of the churn-body supported on the base 10 and in line with the band-wheel. A journal-box 20 is formed near the front end of the beam, the said box being open at its lower and upper ends to receive a driving-shaft 21, held to rotate on balls therein. The ball-bearing I employ preferably consists of a lower cup 22, lower and upper cones 23 and 24, respectively held on the driving-shaft, and an upper cup 25. The tension of the bearing may be regulated by adjusting the lower screw-threaded cone 23. The driving-shaft 21 extends through and above and below such journal-box, which latter is raised above the beam 17, as shown in Fig. 1, and the lower end 26 of the shaft is either squared or of circular shape, whereby it is inserted in a correspondingly-shaped recess 27 in the upper end of the dasher or separator 28, which preferably consists of a shaft 29, provided with a plurality of staggered arms or blades 31, passing through the said shaft and formed of cast metal or thick wire. The upper end of the shaft 29 is detachably held connected with the driving-shaft 21, preferably by a pin 32 inserted through their ends.

The cover or lid 33 of the churn-body is held thereon by the beam 17, having an opening therein for the passage of the dasher-shaft and protuberances 34 for engaging the churn-cover, and it will be observed, especially with reference to Fig. 1, that the connection between the dasher-shaft and driving-shaft and the bearings for the latter are located entirely above the cover or lid of the churn-body, so that there is no danger of the bearings becoming rusty by contact with the milk, and at the same time the contents of the churn are kept free from contamination by the metallic parts of the driving mechanism.

A locking-bar 35 is pivoted between ears 36 on the base 10, and its free end is designed to be inserted in a slot 37 in the end of the beam 17, there being provided an opening 39 in the said end of the locking-bar and a bolt $39^a$, adapted to enter therein, whereby to lock the beam down upon the churn and hold the parts securely in place.

In order to drive the shaft 21 from the band-wheel 18, I attach a pulley 40 on the upper end of the former and connect the pulley with the wheel by a band or belt 41, passing over the idler 42, supported on the beam 17 by an upright 43, and around the band-wheel. A handle 44 is usually employed to turn the band-wheel; but I wish it understood that the said pulley or wheel may be turned by any suitable form of mechanism, such as an engine, motor, or foot-treadle. (Not shown.)

If desired, a dasher of the form shown in Fig. 4 may be substituted for that described above, consisting of a shaft or axis 45, from which depend a plurality of angular arms 46, held together by a ring-like brace 47.

As shown in Fig. 5, the churn may have its driving-shaft 48 journaled in a cone-bearing 49, and the beam 50 is in this form of the device pivoted to a short post 51 on the base 52, and the band-wheel is likewise held on a post 53 on the said base. In other respects this form is similar to the one first described.

In practical operation the churn to be used is placed on the base 10, the lid is placed thereon, the beam 17 is then lowered, and the coupling between the driving-shaft 21 and dasher-shaft is effected, the beam is locked down on the lid, and the band-wheel is turned until the butter is formed. The condition of the cream may be watched by looking from time to time through a door 54, pivoted on the top of the churn.

Having thus described my invention, what I claim as new, and desire to secure by Letters Patent, is—

The herein-described churn-operating mechanism consisting of a base formed with a circular portion for the support of the churn-body, a straight arm extending out from said circular portion and a foot extending laterally from the end of said arm, an upright post secured to the said foot and formed with an aperture at its upper end, a beam having between its ends a lateral lug received in said aperture whereby to pivot the beam on the post, the said beam having an offset portion whereby to bring its front end over the center of the circular part of the base and having a ball-bearing casing in such offset portion and entirely above its upper face, there being provided a slot in the front end of the beam, a shaft in the bearing-casing, a band-wheel on the rear end of said beam and having a belt connection with said shaft, and a locking-bar pivoted to the base at the forward end of the same and adapted to be swung up into the slot in the end of the beam whereby to hold the latter on the churn-body, as and for the purpose set forth.

JAMES WESLEY MAXEY.

Witnesses:
S. S. FISH,
AUG. CARABIN.